US010822038B2

(12) United States Patent
Nakamoto et al.

(10) Patent No.: US 10,822,038 B2
(45) Date of Patent: Nov. 3, 2020

(54) VEHICLE LOWER PORTION STRUCTURE

(71) Applicant: TOYOTA JIDOSHA KABUSHIKI KAISHA, Aichi-ken (JP)

(72) Inventors: Yoshiaki Nakamoto, Nisshin (JP); Naohiko Ueno, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 23 days.

(21) Appl. No.: 16/245,262

(22) Filed: Jan. 11, 2019

(65) Prior Publication Data

US 2019/0263451 A1    Aug. 29, 2019

(30) Foreign Application Priority Data

Feb. 23, 2018   (JP) ................................. 2018-031242

(51) Int. Cl.
  B62D 25/04    (2006.01)
  B62D 25/02    (2006.01)
(52) U.S. Cl.
  CPC ............ B62D 25/02 (2013.01); B62D 25/04 (2013.01)
(58) Field of Classification Search
  CPC ..... B62D 25/02; B62D 25/04; B62D 25/2036
  USPC ............................ 296/193.06, 187.09, 187.1
  See application file for complete search history.

(56) References Cited

U.S. PATENT DOCUMENTS

| 5,246,264 A | * | 9/1993 | Yoshii | ................... B62D 25/04 |
| | | | | 296/203.03 |
| 9,821,853 B2 | * | 11/2017 | Torikawa | ............ B62D 25/025 |
| 2016/0257344 A1 | * | 9/2016 | Hasegawa | ............ B62D 25/025 |
| 2020/0062312 A1 | * | 2/2020 | Tanaka | ................... B62D 25/04 |

FOREIGN PATENT DOCUMENTS

JP     2013-141928 A    7/2013

* cited by examiner

*Primary Examiner* — Dennis H Pedder
(74) *Attorney, Agent, or Firm* — Hauptman Ham, LLP

(57) ABSTRACT

There is provided a vehicle lower portion structure including: a pillar inner panel; a pillar outer panel having a hat-shaped cross-section, and at whose vehicle front-side end portion and vehicle rear-side end portion are formed outer flange portions that are joined to the inner flange portions; a first ridge portion that extends in a vehicle up-down direction at a front wall of the pillar outer panel and at an end portion on the outer side in the vehicle width direction within an area facing a front wheel in a vehicle front-rear direction; and a second ridge portion that extends in the vehicle up-down direction on the inner side in the vehicle width direction of the first ridge portion within the area, and so as to protrude towards the vehicle front side beyond the first ridge portion when viewed in a cross-sectional plan view.

5 Claims, 3 Drawing Sheets

VEHICLE LOWER PORTION STRUCTURE

CROSS-REFERENCE TO RELATED APPLICATION

This application is based on and claims priority under 35 USC 119 from Japanese Patent Application No. 2018-031242 filed on Feb. 23, 2018, the disclosure of which is incorporated by reference herein.

BACKGROUND

Technical Field

The present disclosure relates to a vehicle lower portion structure.

Related Art

A front pillar structure for a vehicle has hitherto been proposed in which a guide apparatus whose angle of inclination relative to a vehicle front-rear direction when viewed in a cross-sectional plan view is smaller than the corresponding angle of inclination of a front wall of a front pillar is provided inside the front pillar at a position facing a front wheel (see, for example, Japanese Unexamined Patent Application (JP-A) No. 2013-141928). According to this structure, in the event of a small overlap collision in which a front end portion which, when viewed in a plan view, is located further to an outer side in a vehicle width direction than a front side member collides with an object, because the backward-moving front wheel is guided outwards and towards the rear by the guide apparatus, any deformation of the front pillar is inhibited.

However, if a structure is employed in which, in a small overlap collision, the backward-moving front wheel is guided outwards and towards the rear by the guide apparatus, there is a possibility that a suspension member and the like that is supporting the front wheel will also be pushed backwards and will collide with the front pillar, and there is also a possibility that a collision load will be input from that suspension member and the like into the front pillar, thereby causing the front pillar to be deformed towards the vehicle cabin side.

SUMMARY

Therefore, it is an object of the present disclosure to provide a vehicle lower portion structure that, in the event of a vehicle small overlap collision, is able to receive a backward-moving front wheel, and consequently is able to inhibit the backward motion of this front wheel.

In order to achieve the above-described object, a vehicle lower portion structure according to a first aspect of the present disclosure is provided with a pillar inner panel that forms an inner side in a vehicle width direction of a front pillar, and in whose vehicle front-side end portion and vehicle rear-side end portion are formed inner flange portions, a pillar outer panel having a substantially hat-shaped cross-sectional configuration that forms an outer side in the vehicle width direction of the front pillar, and in whose vehicle front-side end portion and vehicle rear-side end portion are formed outer flange portions that are joined to the inner flange portions, a first ridge portion that is formed so as to extend in a vehicle up-down direction at a front wall of the pillar outer panel and in an end portion on the outer side in the vehicle width direction within an area facing a front wheel in a vehicle front-rear direction, and a second ridge portion that is formed so as to extend in the vehicle up-down direction on the inner side in the vehicle width direction of the first ridge portion within the area, and so as to protrude towards the vehicle front side beyond the first ridge portion when viewed in a cross-sectional plan view.

According to the first aspect of the present disclosure, a first ridge portion is formed so as to extend in the vehicle up-down direction at a front wall of a pillar outer panel, and in an end portion on an outer side in the vehicle width direction within an area facing a front wheel in the vehicle front-rear direction. In addition, a second ridge portion is formed so as to extend in the vehicle up-down direction on the inner side in the vehicle width direction of the first ridge portion within the area, and so as to protrude towards the vehicle front side beyond the first ridge portion when viewed in a cross-sectional plan view. Accordingly, in the event that the vehicle is in a small overlap collision, the backward-moving front wheel is received by the second ridge portion, and the backward motion of this front wheel is inhibited.

A vehicle lower portion structure of a second aspect of the present disclosure is the vehicle lower portion structure of the first aspect, wherein a lower end portion of the second ridge portion extends on a vehicle lower side beyond an upper end portion of a rocker when viewed in a front view.

According to the second aspect of the present disclosure, a lower end portion of the second ridge portion extends on a vehicle lower side beyond an upper end portion of a rocker when viewed in a front view. Accordingly, a collision load input from the front wheel into the second ridge portion is transmitted to the rocker, and the backward motion of the front wheel is further inhibited.

A vehicle lower portion structure of a third aspect of the present disclosure is the vehicle lower portion structure of the first or second aspects, further including a third ridge portion that is formed so as to extend in the vehicle width direction on the vehicle lower side within the area, and that joins together the first ridge portion and the second ridge portion.

According to the third aspect of the present disclosure, a third ridge portion that joins together the first ridge portion and the second ridge portion is formed so as to extend in the vehicle width direction on the vehicle lower side within the aforementioned area of the pillar outer panel. Accordingly, strength and rigidity on the vehicle lower side within the aforementioned area of the pillar outer panel are improved, and the backward motion of the front wheel is further inhibited.

A vehicle lower portion structure of a fourth aspect of the present disclosure is the vehicle lower portion structure of the third aspect, wherein the third ridge portion is formed on the vehicle lower side of the upper end portion of the rocker when viewed in a front view.

According to the fourth aspect of the present disclosure, the third ridge portion is formed on the vehicle lower side of the upper end portion of the rocker when viewed in a front view. Accordingly, a collision load input from the front wheel into the second ridge portion is transmitted to the rocker via the third ridge portion. Consequently, the backward motion of the front wheel is further inhibited.

A vehicle lower portion structure of a fifth aspect of the present disclosure is the vehicle lower portion structure of the third or fourth aspects, further including a fourth ridge portion that is formed so as to extend in the vehicle width direction on the vehicle upper side within the area, and that joins together the first ridge portion and the second ridge portion, and a position in the vehicle front-rear direction of the third ridge portion when viewed in a side view is substantially the same as a position in the vehicle front-rear direction of the fourth ridge portion.

According to the fifth aspect of the present disclosure, a fourth ridge portion that joins together the first ridge portion and the second ridge portion is formed so as to extend in the vehicle width direction on the vehicle upper side within the aforementioned area of the pillar outer panel. Moreover, the position in the vehicle front-rear direction of the third ridge portion when viewed in a side view is substantially the same as the position in the vehicle front-rear direction of the fourth ridge portion. Accordingly, in the event that the vehicle is in a small overlap collision, the backward-moving front wheel is received more effectively by the second ridge portion, and the backward motion of this front wheel is further inhibited.

A vehicle lower portion structure of a sixth aspect of the present disclosure is the vehicle lower portion structure of any one of the first through fifth aspects, wherein the inner flange portion and the outer flange portion formed at the end portion on the vehicle front side are disposed so as to slope inwards and towards the vehicle front side when viewed in a cross-sectional plan view, and are joined to an end portion on an outer side in the vehicle width direction of a dash panel.

According to the sixth aspect of the present disclosure, the inner flange portion and the outer flange portion that are joined to an end portion on an outer side in the vehicle width direction of a dash panel are disposed so as to slope inwards and towards the vehicle front side when viewed in a cross-sectional plan view. Accordingly, welding guns can be easily inserted from a wheelhouse side of the front wheel, and this enables the inner flange portion and the outer flange portion to be joined easily to the end portion on the outer side in the vehicle width direction of the dash panel.

According to the first aspect of the present disclosure, in the event that a vehicle is in a small overlap collision, it is possible to receive a backward-moving front wheel, and to inhibit the backward motion of this front wheel.

According to the second aspect through fifth aspect of the present disclosure, the backward motion of a front wheel can be further inhibited.

According to the sixth aspect of the present disclosure, an inner flange portion and an outer flange portion can be easily joined to an end portion on the outer side in the vehicle width direction of a dash panel.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment according to the present disclosure will be described in detail based on the drawings. Note that an arrow UP, an arrow FR, and an arrow LH that are shown in the appropriate drawings respectively indicate a vehicle upward direction, a vehicle forward direction, and a vehicle left-side direction. Hereinafter, if front-rear, up-down, or left-right directions are used in the following description, then unless specifically stated otherwise, these refer respectively to the front-rear directions of the vehicle, the up-down directions of the vehicle, and the left-right directions of the vehicle (i.e., the vehicle width direction).

Furthermore, a substantially vehicle front-rear direction, a substantially vehicle up-down direction, and a substantially vehicle left-right direction (i.e., a substantially vehicle width direction) that are slightly offset from the exact directions are also covered by the terms 'vehicle front-rear direction', 'vehicle up-down direction', and 'vehicle left-right direction' ('vehicle width direction') used in the present exemplary embodiment. Additionally, in FIG. 1 through FIG. 3, the left side of a vehicle is shown, however, because the vehicle has left-right symmetry, the right side thereof is the same.

Figure 1:
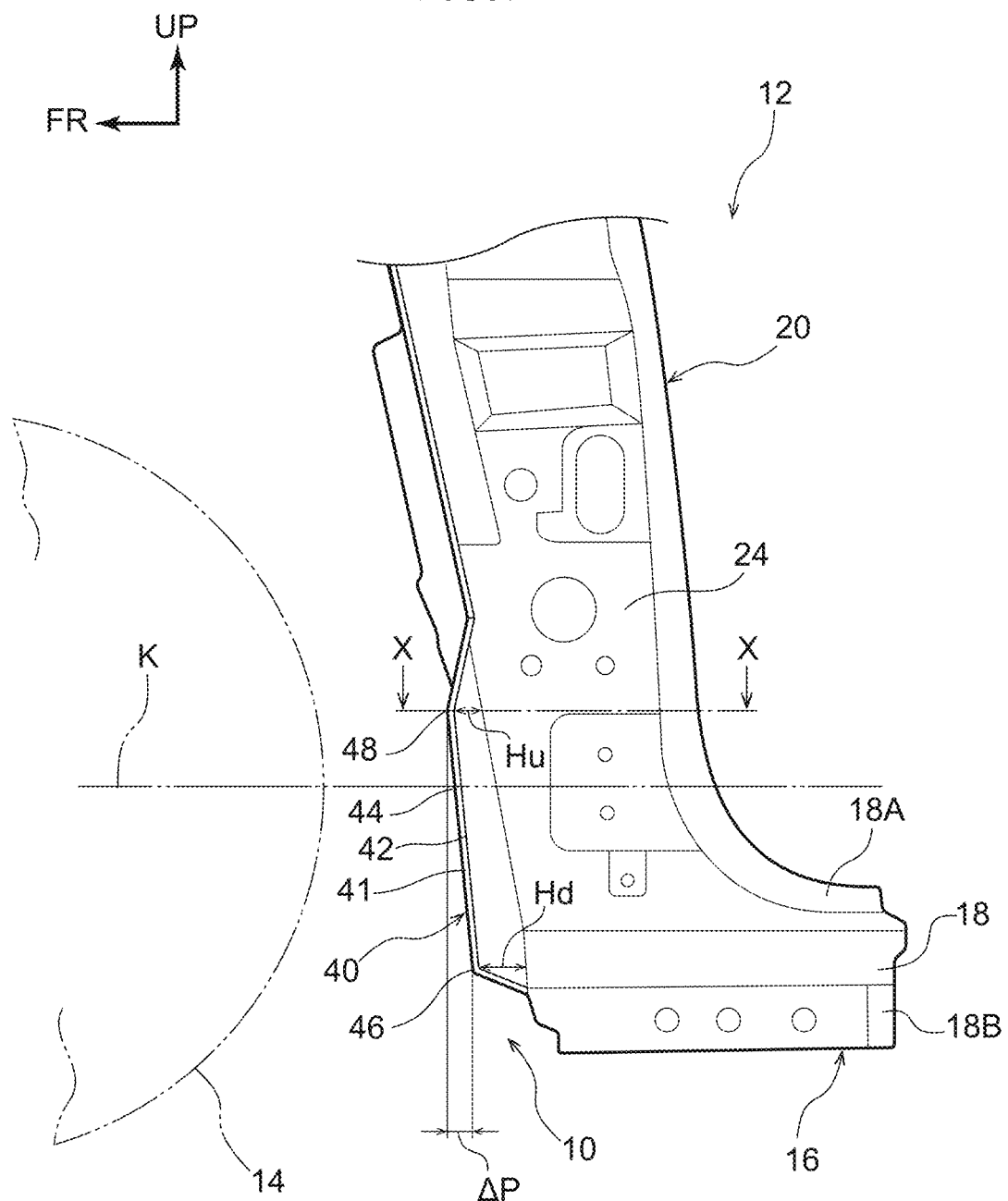
FIG. 1 is a side view showing a front pillar provided with a vehicle lower portion structure according to the present exemplary embodiment.

As is shown in FIG. 1, a pair of left and right front pillars 20 that are provided with a vehicle lower portion structure 10 according to the present exemplary embodiment are disposed on a front portion side of a vehicle 12 and on an outer side thereof in the vehicle width direction. The left-side front pillar 20 shown in FIG. 1 extends in the vehicle up-down direction, and a front wheel 14 is disposed on a vehicle front side of a lower portion of the front pillar 20. A rocker 16 that extend towards the vehicle rear side (i.e., that extends in the vehicle front-rear direction) is provided integrally with a lower end portion of the front pillar 20.

When viewed in a front view from the vehicle front-rear direction, the rocker 16 has a rocker inner panel (not shown in the drawings) that is formed having a substantially hat-shaped cross-sectional configuration which protrudes towards the inner side in the vehicle width direction, and a rocker outer panel 18 that is formed having a substantially hat-shaped cross-sectional configuration which protrudes towards the outer side in the vehicle width direction. Moreover, the rocker 16 is formed having a closed cross-sectional configuration by joining together via spot welding inner flange portions that are formed on an upper end portion and a lower end portion of the rocker inner panel, and outer flange portions 18A and 18B that are formed on an upper end portion and a lower end portion of the rocker outer panel 18.

Figure 2:
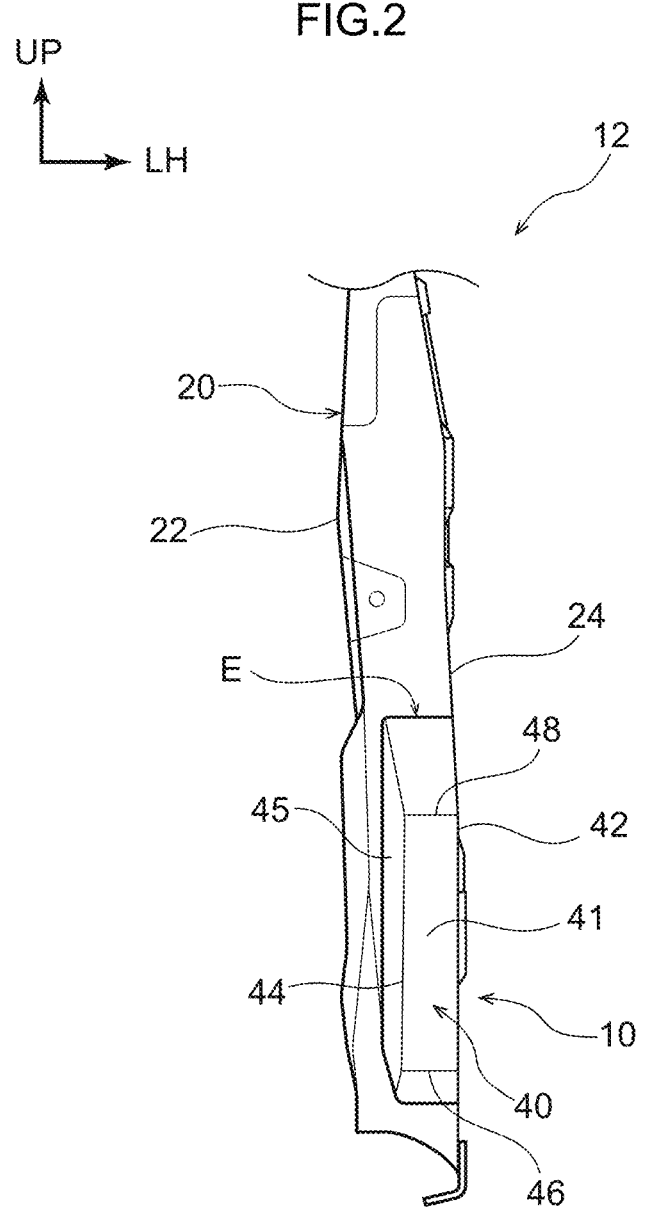
FIG. 2 is a front view showing a front pillar provided with a vehicle lower portion structure according to the present exemplary embodiment.
Figure 3:
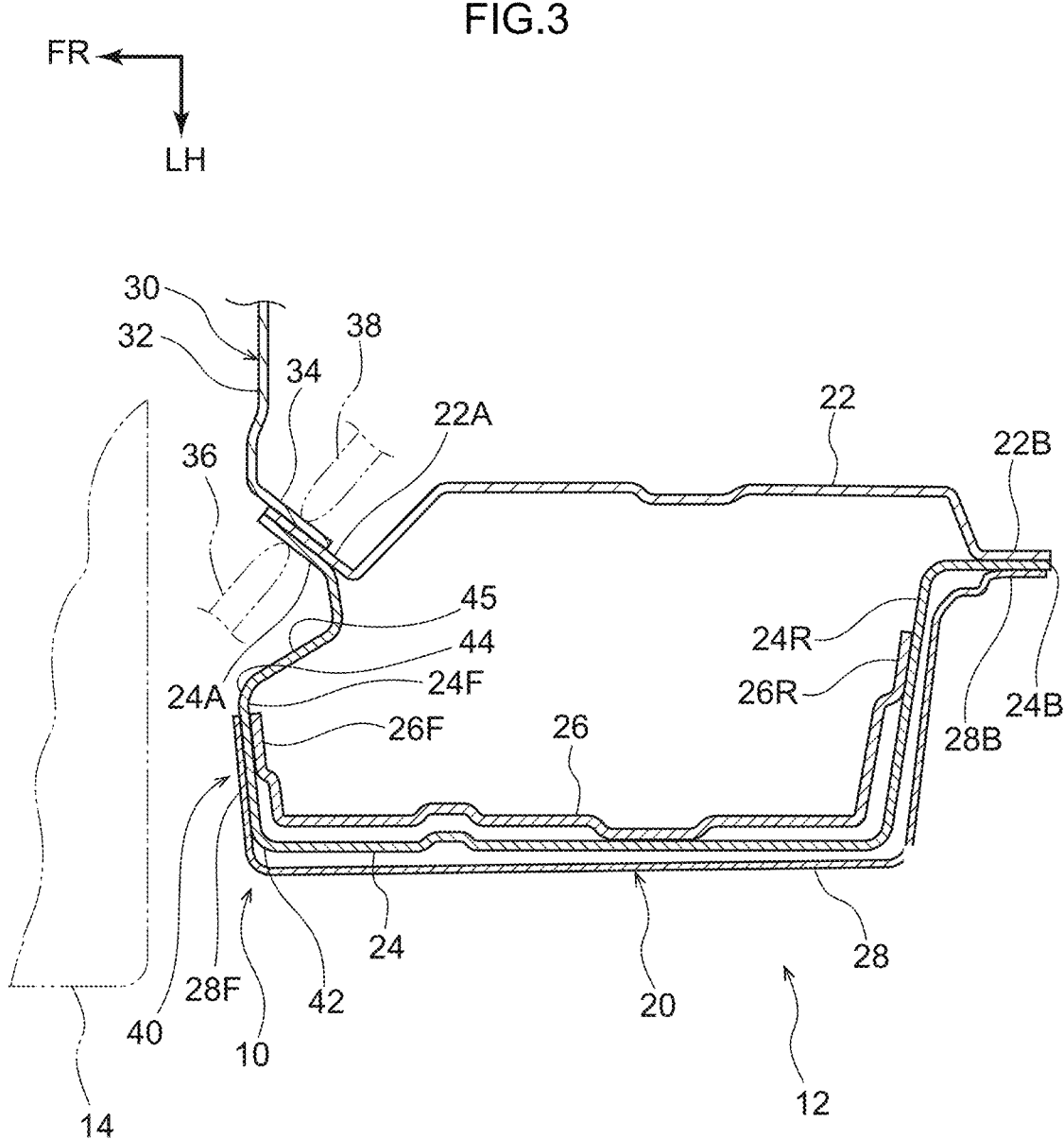
FIG. 3 is a cross-sectional view across a line X-X in FIG. 1.

As is shown in FIG. 1 through FIG. 3, the front pillar 20 has a pillar inner panel 22 that forms an inner side in the vehicle width direction of the front pillar 20, and a pillar outer panel 24 that forms an outer side in the vehicle width direction of the front pillar 20. Note that the pillar outer panel 24 is formed integrally with the rocker outer panel 18.

As is shown in FIG. 3, when viewed in a cross-sectional plan view from the vehicle up-down direction, the pillar inner panel 22 is formed having a substantially hat-shaped cross-sectional configuration which protrudes towards the inner side in the vehicle width direction, and inner flange portions 22A and 22B are formed integrally with an end portion thereof on the vehicle front side and an end portion thereof on the vehicle rear side respectively.

In the same way, when viewed in a cross-sectional plan view from the vehicle up-down direction, the pillar outer panel 24 is also formed having a substantially hat-shaped cross-sectional configuration which protrudes (for a greater protrusion distance than the pillar inner panel 22) towards the outer side in the vehicle width direction, and outer flange portions 24A and 24B are formed integrally with an end portion thereof on the vehicle front side and an end portion thereof on the vehicle rear side respectively.

Accordingly, the front pillar 20 is formed having a closed cross-sectional configuration as a result of the inner flange portions 22A and 22B and the outer flange portions 24A and 24B being mutually superimposed on each other and joined together via spot welding. Note that the inner flange portion 22A and the outer flange portion 24A on the vehicle front side are disposed so as to slope inwards and towards the vehicle front side when viewed in a cross-sectional plan view. As a result, a structure is created in which welding guns 36 and 38 (described below) can be inserted easily.

A pillar reinforcement 26 that extends in the vehicle up-down direction, and has a substantially U-shaped cross-section that, when viewed in a cross-sectional plan view from the vehicle up-down direction, protrudes towards the outer side in the vehicle width direction so as to substantially follow the shape of the pillar outer panel 24 is provided on an inner side in the vehicle width direction of the pillar outer panel 24.

The pillar reinforcement 26 is formed without flange portions being provided on the end portion on the vehicle front side and the end portion on the vehicle rear side thereof, and a front wall 26F of the pillar reinforcement 26 is superimposed from the inner side onto a front wall portion 24F of the pillar outer panel 24, and is then joined thereto via spot welding.

Additionally, a rear wall 26R of the pillar reinforcement 26 is superimposed from the inner side onto a rear wall portion 24R of the pillar outer panel 24, and is then joined thereto via spot welding. The rigidity and strength of the front pillar 20 are improved by this pillar reinforcement 26.

A side member outer panel 28 having a substantially U-shaped cross-section that, when viewed in a cross-sectional plan view from the vehicle up-down direction, protrudes towards the outer side in the vehicle width direction so as to substantially follow the shape of the pillar outer panel 24 and the rocker outer panel 18 is provided on an outer side in the vehicle width direction of the pillar outer panel 24 and the rocker outer panel 18 (note that, in FIG. 1 and FIG. 2, the side member outer panel 28 has been omitted from the drawings).

As is shown in FIG. 3, the side member outer panel 28 is formed without a flange portion being provided on the end portion on the vehicle front side thereof, and only a rear flange portion 28B is formed on the end portion on the vehicle rear side thereof. This rear flange portion 28B is superimposed on the outer flange portion 24B and is joined thereto via spot welding.

In other words, the inner flange portion 22B, the outer flange portion 24B, and the rear flange portion 28B are mutually superimposed in that sequence from the inner side in the vehicle width direction, and are all joined together via spot welding. In addition, a front wall 28F of the side member outer panel 28 is superimposed from the outer side (i.e., from the front side) onto the front wall 24F of the pillar outer panel 24, and is joined thereto via spot welding.

A dash panel 30 that forms a partition between an engine room and a vehicle cabin is disposed on an inner side in the vehicle width direction of a front portion (i.e., the front wall 24F) of the front pillar 20. The dash panel 30 has a substantially planar dash panel main body 32 that extends in the vehicle width direction, and a side flange portion 34 is formed integrally with an end portion (i.e., with both end portions) on the outer side in the vehicle width direction of the dash panel main body 32.

The side flange portion 34 is disposed so as to slope outwards and towards the vehicle rear side when viewed in a cross-sectional plan view (i.e. is disposed so as to be substantially parallel with the inner flange portion 22A and the outer flange portion 24A when viewed in a cross-sectional plan view). The side flange portion 34 is superimposed on the inner flange portion 22A and is joined thereto via spot welding. In other words, the side flange portion 34, the inner flange portion 22A, and the outer flange portion 24A are mutually superimposed in that sequence from the inner side in the vehicle width direction, and are all spot-welded together via the welding guns 36 and 38.

As is shown in FIG. 1 through FIG. 3, a convex portion 40 that protrudes in a substantially trapezoidal configuration when viewed in a side view from the vehicle width direction is formed integrally with a lower portion of the front wall 24F of the pillar outer panel 24 (including the front wall 26F of the pillar reinforcement 26 and the front wall 28F of the side member outer panel 28), and with an area E (see FIG. 2) that faces the front wheel 14 in the vehicle front-rear direction.

In other words, a peripheral edge portion of the convex portion 40 forms an area E in a lower portion of the front wall 24F, while a front wall 41 (described below) of the convex portion 40 is disposed within this area E when viewed in a front view from the vehicle front-rear direction (see FIG. 2).

The convex portion 40A has a first ridge portion 42 that is formed so as to extend in the vehicle up-down direction on an end portion on the outer side in the vehicle width direction, and an end portion on the vehicle front side thereof. In addition, the convex portion 40 also has a second ridge portion 44 that, when viewed in a front view, is formed so as to extend in the vehicle up-down direction on the inner side in the vehicle width direction of the first ridge portion 42, and on the outer side in the vehicle width direction of the outer flange portion 24A.

As is shown in FIG. 2 and FIG. 3, a side wall 45 whose plate thickness direction extends in the vehicle width direction is disposed on the inner side in the vehicle width direction of the second ridge portion 44, and the second ridge portion 44 is formed by a front end portion of this side wall 45 and by an end portion on the inner side in the vehicle width direction of the front wall 41. In other words, the second ridge portion 44 forms a boundary portion between the side wall 45 and the front wall 41.

The second ridge portion 44 protrudes on the vehicle front side beyond the first ridge portion 42 and the dash panel 30 (i.e., the dash panel main body 32) when viewed in a cross-sectional plan view. Additionally, a lower end portion of the second ridge portion 44 extends on the vehicle lower side beyond an upper end portion of the rocker 16 (i.e., the outer flange portion 18A) when viewed in a front view.

Furthermore, the convex portion 40 also has a third ridge portion 46 that is formed so as to extend in the vehicle width direction on the vehicle lower side of the convex portion 40 so as to join together a lower end portion of the first ridge portion 42 and a lower end portion of the second ridge portion 44. The third ridge portion 46 is disposed on the vehicle lower side of the upper end portion of the rocker 16 (i.e., the outer flange portion 18A) when viewed in a front view.

The convex portion 40 also has a fourth ridge portion 48 that is formed so as to extend in the vehicle width direction on the vehicle upper side of the convex portion 40 so as to join together an upper end portion of the first ridge portion 42 and an upper end portion of the second ridge portion 44. Here, a structure is employed in which, in a side view looking from the vehicle width direction, a position in the vehicle front-rear direction of the third ridge portion 46 is substantially the same as a position in the vehicle front-rear direction of the fourth ridge portion 48.

More specifically, as is shown in FIG. 1, the front pillar 20 is disposed on a forward-leaning inclination. In other words, the front wall 24F of the pillar outer panel 24 juts out progressively further towards the vehicle front side as it approaches the vehicle upper side. Accordingly, if a convex portion (not shown in the drawings) were formed to the same protrusion height on the vehicle lower side and the vehicle upper side of the front wall 24F of the pillar outer panel 24, the vehicle upper side of that convex portion would be located further to the vehicle front side than would the vehicle lower side of that convex portion.

However, as is shown in FIG. 1, the convex portion 40 of the present exemplary embodiment is formed such that a height Hd to which the convex portion 40 protrudes towards the vehicle front side on the vehicle lower side thereof is greater than a height Hu to which the convex portion 40 protrudes towards the vehicle front side on the vehicle upper side thereof (i.e., Hd>Hu). Accordingly, a structure is created in which, when viewed in a side view, a difference ΔP between the position in the vehicle front-rear direction of an end portion on the inner side in the vehicle width direction of the fourth ridge portion 48 and the position in the vehicle front-rear direction of an end portion on the inner side in the vehicle width direction of the third ridge portion 46 is close to zero (i.e., less than a few millimeters).

In other words, a structure is employed in which the second ridge portion 44 extends in a substantially vertical direction. As a result, a structure is created in which, even if the front wheel 14 is pushed backwards in the event that the vehicle 12 is in a small overlap collision or an oblique collision, the backward-moving front wheel 14 can be received, firstly, by the second ridge portion 44, and, thereafter, can be received by the front wall 41 (i.e., the front surface) that is surrounded by the first ridge portion 42, the second ridge portion 44, the third ridge portion 46, and the fourth ridge portion 48.

Note that it is preferable that, when viewed in a side view, the fourth ridge portion 48 be formed on the vehicle lower side of the upper end portion of the front wheel 14, and on the vehicle upper side of a virtual horizontal line K (see FIG. 1) that passes through a center of rotation of the front wheel 14, and it is preferable that the fourth ridge portion 48 be formed in as close as possible a position to this virtual horizontal line K. By employing this structure, a rear end portion of the backward-moving front wheel 14 is able to come into contact with the second ridge portion 44 before contacting other portions.

Actions of the vehicle lower portion structure 10 according to the present exemplary embodiment having the above-described structure will now be described.

As has been described above, the convex portion 40 is formed integrally with a lower portion (i.e., the area E) of the front wall 24F (including the front wall 26F of the pillar reinforcement 26 and the front wall 28F of the side member outer panel 28) of the pillar outer panel 24. This convex portion 40 has the first ridge 42 that extends in the vehicle up-down direction at an end portion on the outer side in the vehicle width direction thereof.

In addition, the convex portion 40 also has the second ridge portion 44 that extends in the vehicle up-down direction on the inner side in the vehicle width direction of the first ridge portion 42, and on the outer side in the vehicle width direction of the outer flange portion 24A, and that, when viewed in a cross-sectional plan view, protrudes towards the vehicle front side beyond the first ridge portion 42 and the dash panel 30 (i.e. the dash panel main body 32). Accordingly, the front wheel 14 which is pushed backwards if the vehicle 12 is in a small overlap collision or an oblique collision can be received initially by the second ridge portion 44.

More specifically, as is shown in FIG. 3, the plate thickness direction of the side wall 45 forming part of the second ridge portion 44 extends in the vehicle width direction. Because of this, the side wall 45 has a superior ability to withstand a load input from the vehicle front side. Accordingly, the rear end portion of the front wheel 14 which is pushed backwards if the vehicle 12 is in a small overlap collision or an oblique collision can be appropriately received by the second ridge portion 44, which forms the front end portion of the side wall 45, so that the backward motion of the front wheel 14 is inhibited.

Moreover, the lower end portion of the second ridge portion 44 extends on the vehicle lower side beyond the upper end portion (i.e., the outer flange portion 18A) of the rocker 16 when viewed in a front view. Accordingly, a collision load input from the front wheel 14 into the second ridge portion 44 (i.e., the side wall 45) is transmitted efficiently to the pillar reinforcement 26 of the front pillar 20 and to the rocker 16 before it is transmitted to the dash panel 30, so that the backward motion of the front wheel 14 can be further inhibited.

As a result, deformation of the front pillar 20 and the dash panel 30 (i.e., the dash panel main body 32 and the side flange portion 34) towards the vehicle cabin side can be inhibited, and the distance that a toe board (not shown in the drawings) which is provided in the dash panel 30 (i.e., in the dash panel main body 32) intrudes into the vehicle cabin side can be reduced.

Moreover, if the collision load input from the front wheel 14 is dispersed in this way between the pillar reinforcement 26 of the front pillar 20 and the rocker 16, then the portion of the load that is applied to the dash panel 30 can also be reduced. Accordingly, the strength of the dash panel 30 can be lowered (for example, the plate thickness thereof may be reduced), so that a reduction in the weight of the vehicle 12 (i.e., a reduction in fuel consumption) as well as a reduction in the cost thereof can be achieved.

Furthermore, the convex portion 40 also has the third ridge portion 46 that extends in the vehicle width direction on the vehicle lower side of the convex portion 40 so as to join together the lower end portion of the first ridge portion 42 and the lower end portion of the second ridge portion 44. Accordingly, the strength and rigidity on the vehicle lower side of the front wall 24F of the pillar outer panel 24 can be improved by the third ridge portion 46.

This third ridge portion 46 is disposed on the vehicle lower side of the upper end portion (i.e., the outer flange portion 18A) of the rocker 16 when viewed in a front view. Accordingly, a collision load input from the front wheel 14 into the second ridge portion 44 (i.e., the side wall 45) is transmitted efficiently to the rocker 16 via the third ridge portion 46. As a result, the backward motion of the front wheel 14 can be further inhibited.

The convex portion 40 also has the fourth ridge portion 48 that extends in the vehicle width direction on the vehicle upper side of the convex portion 40 so as to join together the upper end portion of the first ridge portion 42 and the upper end portion of the second ridge portion 44. In addition, when viewed in a side view the position in the vehicle front-rear direction of the end portion on the inner side in the vehicle width direction of the third ridge portion 46 is substantially the same as the position in the vehicle front-rear direction of the end portion on the inner side in the vehicle width direction of the fourth ridge portion 48.

Accordingly, the second ridge portion 44 is disposed so as to extend in a substantially vertical direction, and the rear end portion of the front wheel 14 which is pushed backwards when the vehicle 12 is in a small overlap collision or an oblique collision can be effectively received by the second ridge portion 44. Moreover, after being received by the second ridge portion 44, the front wheel 14 can be appropriately received by the front wall 41 (i.e. the front surface) of the convex portion 40. Accordingly, the backward motion of the front wheel 14 can be further inhibited.

The side flange portion 34 of the dash panel 30 (i.e., of the dash panel main body 32) is disposed so as to slope outwards and towards the vehicle rear side when viewed in a cross-sectional plan view, and the inner flange portion 22A and the outer flange portion 24A that are joined to the side flange portion 34 are disposed so as to slope inwards and towards the vehicle front side when viewed in a cross-sectional plan view.

Accordingly, the welding gun 36 can be easily inserted from between the front wheel 14 and the front wall 24F of the pillar outer panel 24 (i.e., from the wheelhouse side of the front wheel 14), and the welding gun 38 can be easily inserted from between the dash panel main body 32 and the pillar inner panel 22. In other words, according to this type of structure, the inner flange portion 22A and the outer flange portion 24A can be easily joined to the side flange portion 34 of the dash panel main body 32.

The vehicle lower portion structure 10 according to the present exemplary embodiment has been described above based on the drawings, however, the vehicle lower portion structure 10 according to the present exemplary embodiment is not limited to the structure described here and various appropriate design modifications and the like may be made thereto insofar as they do not depart from the spirit or scope of the present disclosure.

For example, the pillar inner panel 22 is not limited to structures formed having a substantially hat-shaped cross-sectional configuration, and the pillar inner panel 22 may also be formed having substantially planar configuration.

Additionally, in the vehicle lower portion structure 10 according to the present exemplary embodiment, a structure in which joins are formed via spot welding is employed, however, the structure used to form joins is not limited to this. For example, it is also possible to employ a structure in which joins are formed via laser welding (see Japanese Unexamined Patent Application Laid-Open No. 2012-115876) in which the weld radius of a laser is made gradually smaller so that the joins are formed in a spot configuration.

What is claimed is:

1. A vehicle lower portion structure comprising:
   a pillar inner panel that forms an inner side in a vehicle width direction of a front pillar, and at whose vehicle front-side end portion and vehicle rear-side end portion are formed inner flange portions;
   a pillar outer panel having a substantially hat-shaped cross-sectional configuration that forms an outer side in the vehicle width direction of the front pillar, and at whose vehicle front-side end portion and vehicle rear-side end portion are formed outer flange portions that are joined to the inner flange portions;
   a first ridge portion that is formed so as to extend in a vehicle up-down direction at a front wall of the pillar outer panel and at an end portion on the outer side in the vehicle width direction within an area facing a front wheel in a vehicle front-rear direction;
   a second ridge portion that is formed so as to extend in the vehicle up-down direction on the inner side in the vehicle width direction of the first ridge portion within the area, and so as to protrude towards the vehicle front side beyond the first ridge portion when viewed in a cross-sectional plan view; and
   a third ridge portion that is formed so as to extend in the vehicle width direction on the vehicle lower side within the area, and that joins together the first ridge portion and the second ridge portion.

2. The vehicle lower portion structure according to claim 1, wherein a lower end portion of the second ridge portion extends on a vehicle lower side beyond an upper end portion of a rocker when viewed in a front view.

3. The vehicle lower portion structure according to claim 1, wherein the third ridge portion is formed on the vehicle lower side of the upper end portion of the rocker when viewed in a front view.

4. The vehicle lower portion structure according to claim 1, further comprising a fourth ridge portion that is formed so as to extend in the vehicle width direction on the vehicle upper side within the area, and that joins together the first ridge portion and the second ridge portion,
   wherein a position in the vehicle front-rear direction of the third ridge portion when viewed in a side view is substantially the same as a position in the vehicle front-rear direction of the fourth ridge portion.

5. The vehicle lower portion structure according to claim 1, wherein the inner flange portion formed at the vehicle front-side end portion of the pillar inner panel and the outer flange portion formed at the vehicle front-side end portion of the pillar outer panel are disposed so as to slope inwards and towards the vehicle front side when viewed in a cross-sectional plan view, and are joined to an end portion on an outer side in the vehicle width direction of a dash panel.

* * * * *